(12) United States Patent
Hayim (10) Patent No.: US 8,549,177 B2
(45) Date of Patent: Oct. 1, 2013

(54) COMMUNICATION SERVER, METHOD AND SYSTEMS, FOR REDUCING TRANSPORTATION VOLUMES OVER COMMUNICATION NETWORKS

(75) Inventor: Shaul Hayim, Tel Aviv (IL)

(73) Assignee: Divinetworks Ltd., Tel Aviv (IL)

( * ) Notice: Subject to any disclaimer, the term of this patent is extended or adjusted under 35 U.S.C. 154(b) by 980 days.

(21) Appl. No.: 10/591,479

(22) PCT Filed: Mar. 2, 2005

(86) PCT No.: PCT/IL2005/000247
§ 371 (c)(1),
(2), (4) Date: Sep. 1, 2006

(87) PCT Pub. No.: WO2005/086415
PCT Pub. Date: Sep. 15, 2005

(65) Prior Publication Data
US 2007/0198523 A1      Aug. 23, 2007

Related U.S. Application Data

(60) Provisional application No. 60/548,855, filed on Mar. 2, 2004.

(51) Int. Cl.
*G06F 15/16*      (2006.01)
*G06F 9/46*       (2006.01)

(52) U.S. Cl.
USPC ........... 709/247; 709/231; 382/232; 382/233; 382/244

(58) Field of Classification Search
USPC .................... 709/247, 231; 375/240; 341/55
See application file for complete search history.

(56) References Cited

U.S. PATENT DOCUMENTS 5,455,576 A * 10/1995 Clark et al. ............. 341/50
5,721,907 A *  2/1998 Pyne .................... 707/10
5,832,235 A * 11/1998 Wilkes .................. 709/247
6,076,084 A *  6/2000 Harlan ................. 707/1

(Continued)

FOREIGN PATENT DOCUMENTS
WO     WO 95/19003     7/1995

OTHER PUBLICATIONS

Rhea, Value-Based Web Caching, Mar. 2003, Retrieved from the internet <URL: portal.acm.org/citation.cfm?id=775239>, pp. 1-10 as printed.*

(Continued)

*Primary Examiner* — Saleh Najjar
*Assistant Examiner* — Michael Chao
(74) *Attorney, Agent, or Firm* — Nath, Goldberg & Meyer; Jerald L. Meyer; Scott C. Langford (57) ABSTRACT

Method for delivering data streams over communication networks is disclosed, the method comprising determining reference points in a stream of data being locations in the stream where predefined number of characters fulfill a predetermined criterion; registering digital signatures being values returned from a predetermined function taken over predefined ranges of content, the ranges are in correlation with the reference points; using the digital signatures to locate locally stored content, and using the reference points or creating a dictionary and using it to synchronize between currently received pieces of data and between locally stored matching content. Communication server implementing the method is also disclosed, and further disclosed are communication systems comprising at least one said server.

16 Claims, 3 Drawing Sheets

(56) References Cited

U.S. PATENT DOCUMENTS

| | | | |
|---|---|---|---|
| 6,178,461 B1* | 1/2001 | Chan et al. | 709/247 |
| 6,292,880 B1* | 9/2001 | Mattis et al. | 711/216 |
| 6,597,812 B1* | 7/2003 | Fallon et al. | 382/232 |
| 6,650,261 B2* | 11/2003 | Nelson et al. | 341/106 |
| 6,826,626 B1* | 11/2004 | McManus | 709/246 |
| 6,961,011 B2* | 11/2005 | Matthews | 341/87 |
| 7,054,912 B2* | 5/2006 | Kanai et al. | 709/213 |
| 7,460,534 B1* | 12/2008 | Bellenger | 370/392 |
| 2002/0184333 A1 | 12/2002 | Appleman | |

OTHER PUBLICATIONS

Chakrabarti, Low-Bandwidth Web Access with Tandem Proxies, Sep. 2002, retrieved from the internet <URL: groups.csail.mit.edu/commit/papers/02/samidh-MEthesis.pdf>, pp. 1-65 as printed.*

PCtools, Change the Maximum Transmission Unit (MTU) Size, 2002, retrieved from the internet <URL: pctools.com/guides/registry/detail/280/>, pp. 1-3 as printed.*

* cited by examiner

COMMUNICATION SERVER, METHOD AND SYSTEMS, FOR REDUCING TRANSPORTATION VOLUMES OVER COMMUNICATION NETWORKS

FIELD OF THE INVENTION

This invention relates to the field of data transportation via communication networks, and more specifically to the field of reducing the volume of such data transportation.

BACKGROUND OF THE INVENTION

The Background chapter of U.S. provisional Patent Application No. 60/548,855 is herewith incorporated by reference.

Reducing bandwidth is a major desire of ISP-s (Internet service provider), home-users, content providers and almost every organization that owns a network. Bandwidth means cost, since communication lines are actually leased according to the amount of data they transfer. To a leaser less bandwidth consumed means less money spent on renting a communication line. To a bandwidth provider less data volume transmitted over a line by a given number of clients means additional clients that may be subscribed without reducing service quality.

U.S. publication No. 2002/0184333 (hereinafter D1) is aimed to improve performances of communication networks. The problem to be solved by D1 is in cases where a plurality of requestors may send requests for the same file, wherein each request is directed to a different provider quoting different URL or even different file name. In conventional caching such plural requests will be related as requests for different files, resulting in respective plural file deliveries.

According to D1 invention, after receiving a complete file from each of the plural sources, it will be assigned a digital signature, which in turn will be recognized as being identical to the digital signature of the same file received from any one of the other sources. Accordingly, further requests for the file from any one of the plural providers shall be satisfied by retrieving the file from a single copy stored locally in the cache server. The improvement is by caching frequently requested files for returning such files to a requester in response to requestor inquiry, wherein the files are indexed according to a digital signature assigned to each file, thus avoiding multiple caching and multiple provider-server deliveries of the same file in cases where one file is retrievable from a plurality of sources.

As can be appreciated, in order to being able to associate between different request forms and a one requested file, D1 requires that a cached file will be recognized twice: first according to its digital signature, and second according to all URLs or file names known as associated to that file. In case that a request for the same file is received and is unfamiliar to the system, it can be satisfied only by retrieving the file from the location indicated by the request, and only after the file has once been retrieved and recognized as a copy of a locally stored file, the file name or URL indicated by the request can be associated to that local file for future use (i.e. for future similar requests). Another drawback of D1 is in that the files stored in some provider computers can change, while the intermediate node continue providing the requestors with an old version of a locally stored file, without being aware of the change.

WO 95/19003 publication (hereinafter D2) relates to cases where a receiving computer has an old file, a transmitting computer has a new file, wherein portion of both files may be identical. In order to allow the receiving computer to update the old file to be identical to the new file, it is required that at least those portions of the new file that are not identical to any portion of the old file be transmitted to the receiving computer. In order to allow both receiving computer and transmitting computer to compare what portions of the file need not be transmitted (thus speeding the transmission process) the receiving computer needs as a preliminary step to divide the old file to segments, to calculate a hash number to each segment and to send the hash numbers to the transmitting computer. The transmitting computer then has to calculate hash numbers "to each possible segment in the new file" (page 7 lines 23-24), then to compare the hash numbers to the hash numbers that has received from the receiving computer.

As can be appreciated, D2 is aimed to reconstruct a file on a receiving computer, from segments of a new file received from a sender and from existing segments of pre-designated old file existing on the receiving computer, such that the result will be a copy of the new file on the receiving computer. U.S. Pat. No. 5,721,907 is aimed similarly to D2. D1 to D3, all relate to a receiving computer which expects a predetermined requested file (or part of file) to be obtained from another computer and stored on the receiving computer. When a file is known it also has a known starting and ending points, that can be used as reference locations for a digital signature to be computed over a known range of data.

Differently from the known art the present invention is aimed to initiating transportation reduction in streams of data in real time, i.e. reducing the volume of data streams whose content is anonymous and cannot yet be recognized as a file or a part of a file by the computer initiating the reduction. Referring for example to live video broadcasting, wherein a plurality of receiving computers receive the same content in real time, the system and method disclosed by D1 are incapable of reducing the volume of transportation in the network since the intermediate node has no file in its cache to be retrieved as nowhere there is any actual "file" in such a case where data is created in real time.

The D2 and D3 inventions are also irrelevant for such a case since there is no "old file" in the receiving computers whose portions may be identical to the expected data.

In the context of the present invention—Anchor—location in a stream of data determined according to content thereof fulfilling a predetermined criteria. The criteria is set such that a satisfactory probability for the presence of an anchor over a predetermined amount of data is addressed.

Anchoring—registering values returned by a predetermined function (hereinafter referred to also as "anchoring function") operated for examining predetermined ranges of content whose location being in correlation with anchors. The function and the ranges of data are selected such that the returned values can be used as signatures identifying the content in a satisfying probability.

SUMMARY OF THE INVENTION

The present invention relates to a method and systems for synchronizing between anonymous contents of data streams currently passing through communication server and between similar contents that have already been passed through said servers and stored locally, such that transportation of certain amounts of said streaming data may be eliminated.

According to some embodiments the synchronization is also between several copies of similar data content passing through the server simultaneously. A system of the present invention comprises at least one server capable of reducing volumes of network transportation in-line as a result of self initiated procedures which require no information concerning the source of the data, its type, its name, or any other of its identification details, in order to achieve volume reduction. This is in contrast to methods according which the expected volume reduction depends on file names or routs in order to allow synchronization between a requested file and a locally stored file. Furthermore, when a file to be transferred is known it has also known starting and ending points, that can be used as reference locations for a digital signature to be computed over a predetermined range of data. In case of streams of anonymous data whose content has no starting or ending points agreed to all (as is the case according to the present invention), there are no agreed reference points allowing to calculate a repeatable digital signature. If a digital signature cannot be repeated, it cannot be used to identify the content. As will be further explained the server according to the present invention comprises an anchor determination unit who solves this problem.

For further use of certain portions of the data streams passing through it, the server according to the present invention (hereinafter will be referred to also as "anonymous data caching server" or "ADC server") stores such portions of the data without being aware of file names, wholeness of data, URLs, file types, and data origin or destination. According to the present invention only pure data is stored by the server, with no ID tags received from external file requesters or file providers.

A system according to the present invention comprises a communication server having a communication circuit for receiving and delivering streams of data, and at least one memory media accessible thereto.

An anchor determination unit is provided in the server capable of determining locations in the data streams where predefined groups of characters from the stream fulfill a predetermined criteria, the locations of such groups are determined as anchors (referred to also as "reference points").

The server further comprises—an anchoring-function unit for returning values (hereinafter will be referred to also as "digital signatures") as a function of the content of ranges of data in the stream wherein the ranges are in a known correlation with respect to the anchors (said values can then be of help when searching for the content);

a data-partitioning unit for dividing the stream of data into data blocks;

a registration unit for storing lists of values returned from the anchoring-function unit, wherein each value being associated by an appropriate reference with a specific data block containing the range of data from which said value returned by the anchoring function (each of the values associated with a block will be referred to in the context of the present invention as "a block ID", and in some particular cases as "a hash key").

According to various embodiments of the present invention a plurality of block IDs are associated with each data block under normal circumstances.

According to one embodiment of the present invention the block partitioning unit divides the data into blocks of a predetermined size. For example, the predetermined size may be chosen to be 64K of data.

According to another embodiment and in order to increase compatibility between blocks containing similar data on different servers and to avoid different partitioning of the data on each transmission of it, the partitioning unit determines the starting location of blocks as a function of data contained in the data stream. According to this variation the block partitioning unit activates on the data streams a function for determining anchors, wherein the function is designed to a probability of returning one anchor per data range of a satisfactory size, e.g. a function according which an anchor can be expected once per about 50K of data.

The data blocks may be saved to a caching memory for later retrieval according to block IDs who are associated with such blocks by appropriate references.

As mentioned above, an anchor is a location in a stream of data determined according to content thereof fulfilling a predetermined criteria. The criteria is set such that a satisfactory probability for the presence of an anchor over a predetermined amount of data is addressed.

For example, according to one embodiment of the invention a set of anchors associated to a data block may be the set of locations where a short string appears in the block, e.g. every place where "aaa" appears in the block. According to another embodiment the set of anchors may be the set of locations of n-tuples where a hash function over this n-tuple returns a predefined value, e.g. every location of a triplet of bytes in the block, whose returned hash value is 123.

Some examples of a hash functions that may be used to find an anchor are LFSR (aka CRC), DES, MD5, etc.

According to one preferred embodiment the anchoring function is designed such that the probability for finding an anchor is every 500 bytes in average. Accordingly, three anchors are expected to be found in every data packet. In case the data is divided to data blocks of 64K each, 128 anchors are expected per each block. In case that blocks of about 50K are used, the expected number of anchors is reduced respectively and thus about 100 anchors are expected per each block.

As mentioned above, anchoring is registering values returned by a predetermined function ("anchoring function") operated for examining predetermined ranges of content whose location being in correlation with anchors. The function and the ranges of data are selected such that the returned values can be used as signatures identifying the content in a satisfying probability. According to one preferred embodiment of the present invention the anchoring function is chosen to be a hash function taken on 100 consecutive bytes starting at an anchor and returning a 96 bit hash value as a digital signature.

According to one preferred embodiment of the present invention the registration unit (or the server by any other appropriate unit) is further designed to register the anchors in correlation with the registration of the block IDs. For example, after a given data block was partitioned from the data stream by the data-partitioning unit, the location of the anchors are registered e.g. as offset references to be measured from the starting point of the block. By such registration, when a digital signature value is given, an identical value can be searched for in a list of block IDs, and if located, the block to which it is associated may be retrieved or accessed. The data range from which the digital signature value has been returned, may thus be easily located according to the location of the anchor associated with this value, measured from the block's starting point.

According to another embodiment, the anchor locations in the block are not being registered. According to this embodiment, when a digital signature value is given, an identical value can be searched for in a list of block IDs, and if located, the block to which is associated may be retrieved or accessed. Since anchor locations are not registered according to this particular embodiment, the location of the data range in the block from which the digital signature value has been returned is unknown yet. Thus, according to this embodiment a dictionary is to be used, as will be explained in the detailed description chapter. For this purpose, the ADC server may further comprise a dictionary generator unit.

Either through said anchor registration embodiment or through a dictionary generator embodiment, a currently received data packet from which a digital signature has been returned by the anchoring-function unit can be synchronized with a similar data packet contained in a data block stored already in the memory, such that they may easily be compared in order to verify whether they are identical. In case they are identical, the currently received packet can be replaced by a reference to its location in the block, thus reducing the volume of data sent to the receiving end. In they are not identical the volume of data to be sent can still be reduced by replacing identical sub-strings (if exist) with references to their starting and ending locations in the block.

The server of the present invention can be used in one of two basic options, or combinations thereof, in order to reduce transportation volumes over communication networks:

(i) in conjunction with at least one corresponding server of a similar type, both servers located at remote ends of a virtual communication line(in the context of the present invention the term communication line includes a wireless connection, as one of the possible options) connecting between them; and (ii) in conjunction with at least one data provider computer (hereinafter "data provider") comprising a redirection unit;

For the purpose of facilitating the description it will be assumed that two anonymous data caching servers according to the present invention are connected on two remote ends of a communication line, and are both working also in conjunction with data providers connected to each through respective networks and routers.

As a starting point, let assume the two ADC servers has cache memories that are empty. Data streams are directed through the ADC servers. Each ADC server processes the data passing it for determining anchors, for calculating digital signatures, for partitioning the data into blocks, and for creating block IDs. Under normal circumstances, the blocks are stored in the caches which are thus start to being filled with blocks of pure data containing no identification information. The block IDs of each block are also being stored, such that the address of each block stored in the cache is linked with a respective list of block IDs. Simultaneously with the build of the cache in each ADC server, the blocks being sent packet by packet to the intended directions that is according to the circumstances either to the corresponding ADC server at the opposite end of the communication line, or to conventional receivers to which the data is routed. Whenever a digital signature value is returned from a received data stream, the stored lists of block IDs in the ADC server are searched for identical value. Upon recognition of a block ID having such identical value, the block associated to this block ID is accessed. The server now locates the specific point in that block from which the block ID was returned by the anchoring function, and synchronizes between the location of the currently received data packet and the location in the block of the originally received data packet, e.g. by using the known offset of the anchor from the starting point of the block (according to the embodiment wherein the anchors are saved with the block IDs), or e.g. through the use of a dictionary (according to another embodiment).

The currently received packet and the original one, can now be compared for verifying are they identical, or for determining what portions of them (or what large substrings of them) are identical.

In case that they are, (and according to various other embodiments in case that certain portions of them are identical), the ADC server initiate a procedure for reducing the volume of the data stream which is now expected to contain data which is already stored locally.

If the source of the data is a data provider, the initiating ADC server sends a message to that data provider to activate anchoring function and to send only references to locations of anchors in the block, instead of sending the data itself. As long as the references received allows the server to retrieve whole packets from the locally stored block, the data provider keeps sending references, instead of full data. If at any given point the server recognizes mismatches between the signatures of the received data and those of the locally stored one, it sends a message to the provider to return to conventional transmission.

In case the received data streams are to be forwarded to a corresponding ADC server, the initiating server send a message to the corresponding server to retrieve from its cache a block according to a currently recognized signature. One or several more currently received packets are then sent to the corresponding server in conventional transmission mode, until the corresponding server confirms that the intended block was recognized and fetched.

In the initializing server—portions of the currently received packets which are identical to locally stored ones are then replaced by references to the block, allowing the corresponding server to reconstruct them from the block. Since the references are short than the data they replace, the packet size can be certainly reduced. Reduced sized packets are thus sent to the corresponding server as long as data identical to the currently received one can be retrieved locally.

According to one preferred embodiment, the ADC server is further used for eliminating unnecessary transportation volume in cases where identical information flows simultaneously to different destination through the server. According to this embodiment the initiating server searches for anchors in currently received packets and sometimes may recognize that several locally stored packets returns identical signatures. This may be the case, for example, when a live video is being broadcasted to a plurality of receivers. In such a case, the initiating server can send to the corresponding server a massage to use a single packet being sent, and distributing it to all the receivers to which identical packets are waiting in the initiating server. The volume of transportation in such case can meaningfully be reduced, and the downloading time of large amounts of data can meaningfully be shortened.

Some basic embodiments of the invention will now be described in brief:

The present invention relates to a communication server for delivering data streams to a remote destination over a communication network, the server comprising a replacement unit for replacing pieces of data from intended incoming data streams to be received from a remote sender by identical data pieces retrievable from a data storage accessible thereto, according to references supplied by the remote sender; characterized by an identification unit for identifying the pieces of data to be replaced according to a digital signature that is a function of data contained in said pieces, and by an anchor-determination unit for determining locations in the data streams where predefined groups of characters from the stream fulfill a predetermined criterion, the locations of such groups being reference points to the digital signatures.

According to various preferred embodiments the communication server is further comprising messaging unit for notifying a remote sender to stop delivering intended incoming pieces of data which are retrievable from a data storage accessible thereto.

The remote sender can be a PC delivering data (or files that the server of the invention refers to as plain data).

According to various preferred embodiment the server units are designed to process pieces of data being packets of TCP/IP transmission protocol.

According to various preferred embodiments the server is further comprising a data storage accessible thereto, wherein the packets are stored in the data storage in blocks of variable size which is determined according to anchor location on the original data stream.

According to various embodiments the digital signature returned by the anchoring-function unit is based on any of CRC, SHA1 or DES computed value of a predetermined number of bytes from a selected piece of data.

According to some preferred embodiments the digital signature is calculated from a predetermined number of bytes of data, the location of said bytes in the stream of data is in correlation with at least one anchor, and the anchor is a pointer to a location in the stream of data having a compatibility with a predetermined criteria.

According to various preferred embodiments said criteria is a function of data contained in said pieces of data and is independent of a title, address or routing information of said data.

The function is responsive to a predetermined character combination such that an anchor is assigned upon recognition of said character combination.

According to various embodiments the character combination is a short string of predefined characters.

According to various embodiments a set of anchors is assigned to a piece of data, each anchor from the set is in correlation to an n-tuple location in said piece of data wherein the function is a hash function yielding a predefined value over the n-tuple.

According to various preferred embodiments the hash function is selected from the group containing LFSR, CRC, SHA1, DES, and MD5.

The server and systems containing it may treats files delivered through P2P communication no matter what their size is or whether they are divided and downloaded from a plurality of providers, since the present invention relates to any type of files as plain anonymous data streams.

The present invention relate also to a method for delivering data streams over communication networks, the method comprising determining reference points in a stream of data being locations in the stream where predefined number of characters fulfill a predetermined criterion; registering digital signatures being values returned from a predetermined function taken over predefined ranges of content, the ranges are in correlation with the reference points; using the digital signatures to locate locally stored content, and using the reference points or creating a dictionary and using it for synchronizing between currently received pieces of data and between locally stored matching content.

The present invention further relates to a computer readable media containing instructions for controlling a computer system to implement the method.

A system for reducing transportation volumes over communication networks, comprising at least one communication server as defined by the description above an hereinafter is also within the scope of the present invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

The invention relates to a method for reducing bandwidth by packet caching, and a system for reducing bandwidth by packet caching. The core of the invention is of storing packets and retrieving them fast in an efficient way. It will now be described how packets can be stored for then be retrieved efficiently.

Throughout the following description a file being transferred shall be referred to as a stream of data. This is a reasonable consideration since devices dealing with real time streams in the net do not know in advance the file that is being transferred and they learn the file as it is passed through them, just as a stream.

A communication server according to the present invention learns the data as it reads packets belonging to the stream from the communication line. The stream being learned is to be partitioned into data blocks. The size of a block is independent of the packet size. Hereafter a block size of 64K will be referred to as an example (although it can be of any acceptable size whatsoever), according to one embodiment. A block also need not start at a beginning of packet. As we read packets of a stream from the net their data is copied into a data block. When a block is fall, and contains 64K of data it will be written to the local disk after performing some preprocessing to be discussed below. According to another embodiment the ending position of a block and the beginning of the next block in a stream is determined by anchors (in a way that will be explained later). Through the use of anchors (in contradiction to the use of fixed sized blocks according to the other embodiment) block partitioning becomes dependent of its content (since the anchor is determined as a function of the contained data) and thus blocks containing identical data will more likely be found over the network as being identically partitioned, while partitioning of fixed sized blocks may occasionally be changed since no inherent rule determines their partitioning.

According to various embodiments hash functions will be used for facilitating locating of required data during the processes taken according to the present invention. A hash key is defined to be a number of n bits that depends on the value of a range of data that its size is m bytes, where the probability of having two identical hash keys for two different m-byte values is very low. Hash keys can be created by computing the CRC value of m bytes, or by calculating their SHA1 value, DES value, or any other function known to satisfy the above condition. The decision about the specific values of n and m can be made by those who are skilled in the art depending on the network and the packet type that the method is applied on. Hash keys may be used for locating a required block on the disk. Hash keys may also be used for locating a specific required packet in the block.

According to one preferred embodiment of the present invention a 64-bit hash key taken on 100 bytes is used for allowing locating a block on the disk.

According to another preferred embodiment of the present invention a 96-bit hash key taken on 100 bytes is used for allowing locating a block on the disk.

According to some embodiments a 16-bit hash key taken of 5 bytes is used for creating a dictionary that will allow to find a requested packet in a block.

According to various embodiments of the present invention anchors are preferably selected to be dependent of only small amounts of data (e.g. a few bytes), and independent of the starting position of the block that contains the anchors or of the starting position of the packets containing them. One example for defining anchors on a stream is choosing an anchor to be every position in the stream where the string "abc" appears. Another example for defining anchors is choosing anchors to be every position in the stream where a 9-bit hash of 5 consecutive bytes is zero. A 9-bit CRC was chosen because when a CRC of five byte string is given it is easy to remove the contribution of the first byte in the string and to add a new byte at the end of the string. Thus the CRC can be "rolled" over the buffer efficiently.

Every place we an anchor is being found, a 96-bit hash key is computed over the next 100 consecutive bytes. The value of the hash key returned is called "block ID". Obviously, according to the described procedure a block will have a plurality of IDs. In order to prevent too many block IDs, it is possible to skip a certain amount of data after finding an anchor, e.g. it is possible to sldp 400 bytes or 500 bytes far from the previous anchor considered, before finding the next anchor. Accordingly, it is appreciated that a packet will hold no more than three clock IDs, and that a block of 64K will hold no more than 128 block IDs.

All the block IDs are then saved in an array on the disk. This array will be referred to also as the "hash array". Every block ID is associated to one entry of the hash array, although many IDs might by mapped to the same entry, as they all refer to one specific block. At each entry a list of block IDs is thus kept, together with the location of their associated block.

According to some embodiments hash keys are computed for every block, on every m consecutive bytes of the block, and every hash key is being stored in an array together with the position where it was generated. This array will be referred to also as "dictionary" of the block, and it will be used according to these embodiments for locating required packets in the block. According to one embodiment, and as mentioned earlier, the hash key is chosen to be 16 bits long, and it is calculated over 5 consecutive bytes. The values of the hash keys returned from the calculation are stored in an array, however, according to other embodiment variations they can be stored in a list, a tree or any structure that allows efficient searching. The dictionary thus is set to be an array of 65536 entries (wherein each entry corresponds to one different possible combination of the 16 bit key). In case a hash key h was calculated at position p, the h-th entry of the array will be set to hold the number p. Accordingly, in order to find the position in a packet where a hash key h was computed the value stored in the h-th entry in the array should by read.

The dictionary size can be reduced by computing a hash key only for every m consecutive bytes whose starting position inside the packet can be divided by x, where x is a parameter that can be chosen by the developer. A higher value of x will result in smaller dictionary size. For example x may be chosen to be 16.

Figure 1:
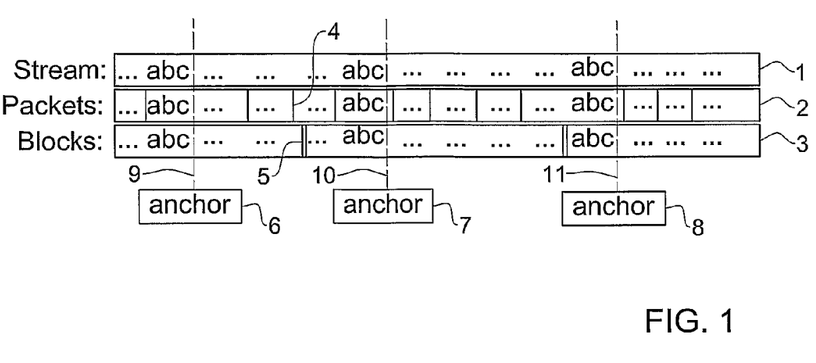
FIG. 1 illustrates the relation between data stream, packets contained in the data stream, data blocks partitioned from the data stream, and anchors generated according to the present invention in order to allow effective correlation between repeating instances of similar anonymous data streams.

Reference is made now to FIG. 1 which illustrates the relation between data stream represented by the frame 1. The dots inside the frame represents the data content. Packets are contained in the data stream, as represented by the frame 2, which is identical to the frame 1, with the difference that frame 2 illustrates the starting and the ending points of the packets by vertical lines 4. Data blocks to be partitioned from the data stream are represented by vertical double lines 5, and anchors 6, 7 and 8 generated according to the present invention in order to allow effective correlation between repeating instances of similar anonymous data streams are also illustrated. In the illustrated example, the anchors are defined as a location where the combination of characters 'abc' is found in the data stream. Accordingly, the instances of such combinations in the stream were highlighted by explicitly typing said character combination. The vertical doted lines 9, 10 and 11, are passing through the stream, packets and block representations in order to emphasize that anchors provide inherent reference points to locations in the data stream, such that no matter how this stream will be partitioned, the reference points can always be recognized by activating a function who returns an anchor whenever the predefined character combination is detected.

Figure 2:
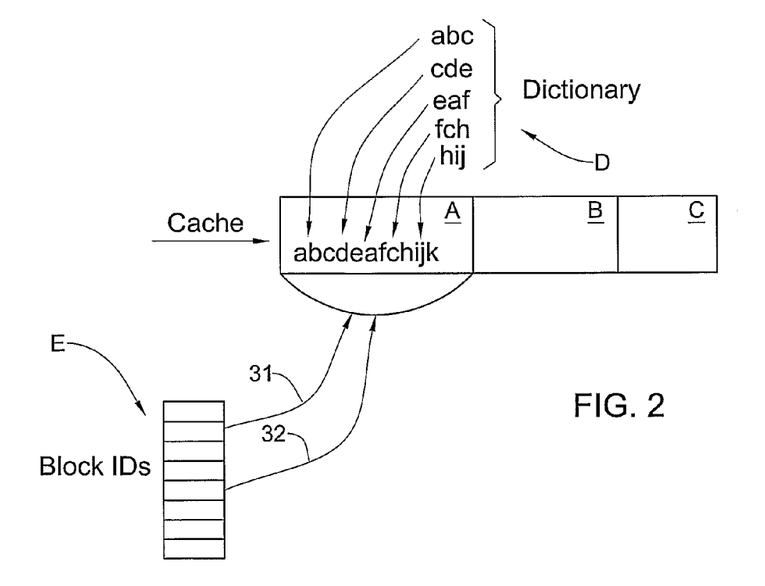
FIG. 2 illustrates the relationship between blocks of data, between an array of block IDs allowing to locate locally stored blocks, and between a dictionary which according to some embodiments allows to locate packets in a block.

Referring to FIG. 2, three blocks stored in the cache are represented by respective three frames marked A, B, and C. The first block, A, contains the string "abcdeafchijk". The dictionary of the first block is represented by a frame marked D. The dictionary D indicates the locations in the block A where triplets of characters appear. The Fig. further illustrates an array of block IDs (marked E), wherein in the illustrated example two of the IDs are associated with and thus addressing to the first block A, as represented by respective arrows 31 and 32. Upon receiving a packet, it is being searched for an anchor, and when found, a digital signature is computed by a hash function returning a hash value from the 100 bytes following the anchor. The digital signature value is then searched for in an array storing block IDs. This array also stores the location in the cache in which the block is stored. In case a match occurs between the digital signature value and a value of any one of the block IDs, the block associated with the matching block ID is fetched from the cache. After fetching the block into memory, the dictionary can be used to find large substrings of the packet in the block which are identical to corresponding substrings in the currently received packet. Such substrings can then be deleted from the packet and replaced by references to the block.

An ADC server who receives such processed packet may retrieve said deleted parts of the packet from its local cache, and thus the volume of the transmitted data is reduced in accordance with the volume of the deleted substrings.

The process executed according to various embodiments of the present invention will be further explained assuming a configuration wherein two ADC servers are connected respectively on opposite ends of a communication line, and assuming (for simplicity of explanation) that all communication are transmitted from the same end of the line (in the context of the present invention "initiator end") and received at the other end (in the context of the present invention "receiving end"), and that the servers at both ends of the line have run for a sufficient amount of time and have studied the information transmitted over the line, and have built the data structures explained above.

In brief, same configuration is related to according to the present invention as a system comprising two ADC servers, one at opposite end of a communication line. The communication transmitted over the line passes through both servers. The two servers study the files and streams that are transmitted over the line. They partition them into blocks and store the blocks on their local disk together with a dictionary (according to one variation) or with anchor references (according to another variation). They also update their hash file containing the block IDs, according to newly stored blocks. When a packet of a stream is transferred, the two computers search their disks, using their hash file, and fetch a block that was stored previously. This block is used by the transmitting computer to replace data in the packet with references to data inside the block, and by the receiving computer to reconstruct the packet according to the references. Said process will now be described in more detail.

A packet read from the network at the initiator end is a part of a stream of communication. This stream of communication is distinguished from other communications by its communication ID, which is the four tuple: source IP address, destination IP address, source port and destination port. Upon reading the packet and before it is transmitted to the receiving end, the initiator server goes over the packet to find anchors in this packet. The expected number of anchors in a packet is three (assuming the aforementioned embodiment directed for such number of anchors is being used). This means that there is a certain probability that some anchor will be found. Notice that the position of the anchor in the stream is a function of the packet content rather then its position in the packet. This guarantees that the anchor we found in a currently received packet corresponds to an anchor that was previously found when the stream was learned, if indeed the two packet contains identical portions of information.

After finding one such anchor the digital signature value defined at that anchor is computed. We use the hash array to search for a block ID that matches the digital signature returned from said calculation. In case a match is found the block associated with the matching block ID is fetched from the cache. Meanwhile the packet is transmitted over the line to the receiving end, following a message that tells it to fetch the same block from its disk. Since said block has been passed already in the past through the initiator end (either to or from the receiving end), it is expected that under normal conditions it has to be found also on the receiving end. It takes the disk of the receiving end a few milliseconds to fetch the block. During this time, more packets of the same stream may be transmitted unchanged (i.e. through conventional transmission mode) over the line. The number of these packets is not expected to be greater than a dozen.

After the block has been fetched from the disk of the receiving end, and when a packet arrives from the same stream, the position of the packet inside the stream may be determined using the dictionary. For this purpose a hash key on five bytes inside the packet is computed and the value h is returned. The h-th entry of the dictionary, which holds the position where a string that generated the same hash has appeared in the block is then read, and the data in that location in the previously stored packet is compared with the data in the currently received packet to see if they match. If they do, the data in the packet is replaced with an indication that the data appears in the block, together with its position in the block and its length. Said procedure is repeated as many times as needed until going over the entire packet. The server at the receiving end of the line reconstructs the packet by copying the indicated data from the block into the packet.

In order to improve the fetching time of blocks from the cache, prefetching techniques may be applied. For example, a block (that may later be recognized as a required one) may be prefetched before it is actually needed by identifying that the stream reached the end of the current block, and then prefetching a set of blocks that it is predicted that one of them will be needed next. For this purpose this, a list of blocks that may be needed after a specific block is used may be studied for every block e.g. by means of self learning techniques.

Figure 3:
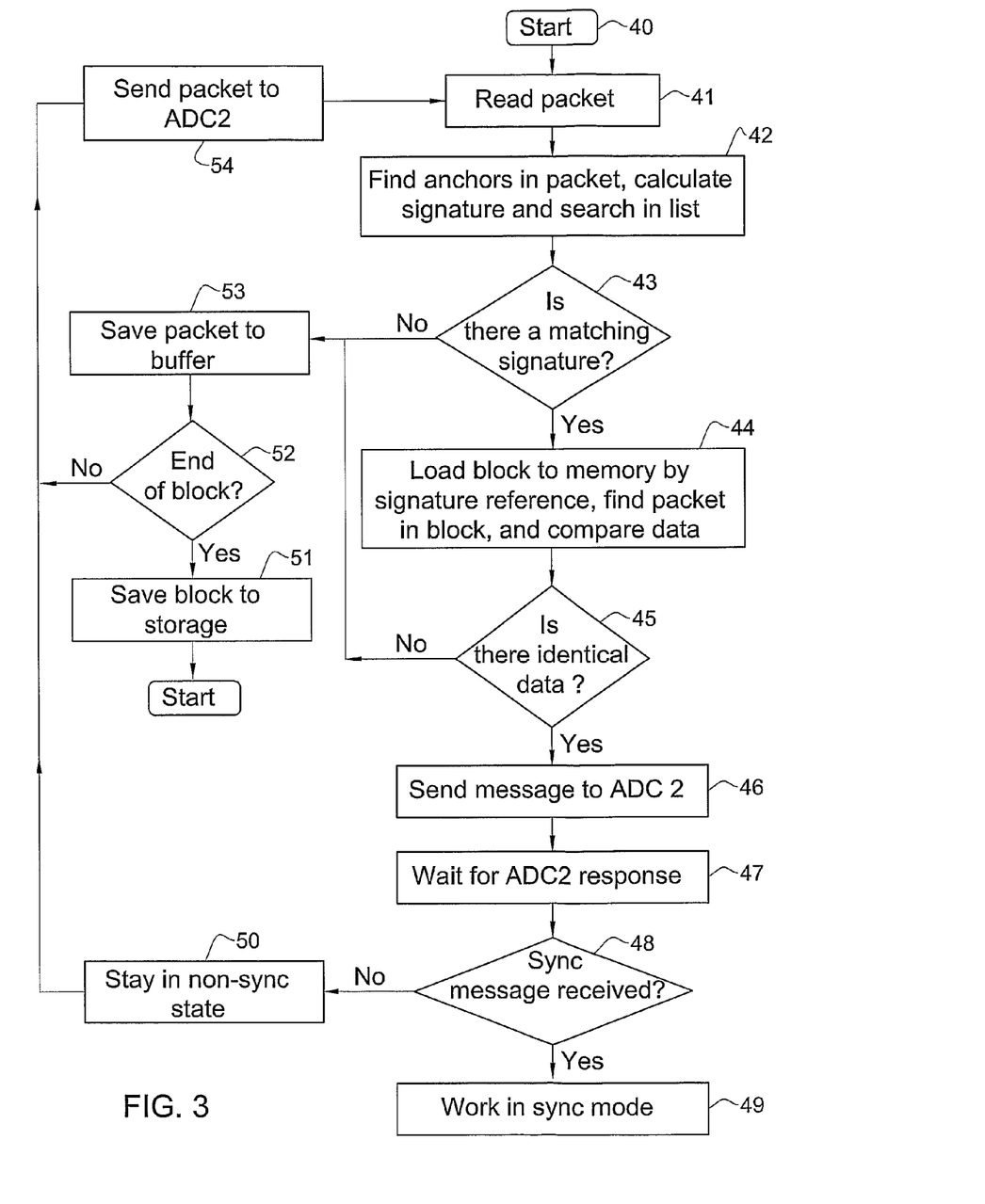
FIG. 3 illustrates a first part of a flow chart demonstrating a process for reducing transportation volume over a network line according to one preferred embodiment of the present invention.

FIG. 3 illustrates a first part of a flow chart demonstrating a process for reducing transportation volume over a network line according to one preferred embodiment of the present invention. The first part of the flow chart illustrates in general how a first communication server ADC1 prepares for working in conjunction with a similar second communication server ADC2. ADC1 first reads a packet as illustrated by step 41, find anchors in the packet, calculates digital signature over predetermined data ranges whose location is in correlation to the anchors, and searches a list of block IDs trying to locate previously stored signatures that are identical to currently retrieved ones, as represented by steps 42 and 43 of the process. In case a matching was found, the process proceed in step 44, by loading a block from a local cache according to the location of the block which is associated to the block ID who was found as matching a signature of the currently received packet. The data of the currently received packet is then compared with the data in the block (after synchronizing the respective packets e.g. according to the anchors with which the signature is associated). In case step 45 is accomplished positively and identical data was found the first server sends a message (as represented by step 46) to the second server ADC2, to fetch a block from its local cache according to the now known matching signature. The first server waits for a confirmation from the second server, and stays in non-sync mode of operation whenever a confirmation of fetching the appropriate block has not been returned from the second server, as represented by steps 47, 48, and 50, wherein a non-sync mode means that packets continue to being sent to the second server conventionally (i.e. in their original form) as represented by step 54. The process is thus repeated until a confirmation from the second server has been received and the two servers start working in sync mode as represented by step 49 and as further detailed in FIG. 4, or until the compared packets are found not identical such that the process continues from step 45 to step 53 and the current packet which is unknown yet to the first server is maintained in a buffer as represented by step 53, and further being sent conventionally to the second server as represented by step 54, while then the process is repeated in reading another packet until the buffer has been filled by a whole block of unfamiliar data, which is then stored locally as represented by step 51, together with its block IDs and associated anchor locations, allowing for a future retrieval of the block upon recognition of matching signature in some data stream to be received in the future.

Figure 4:
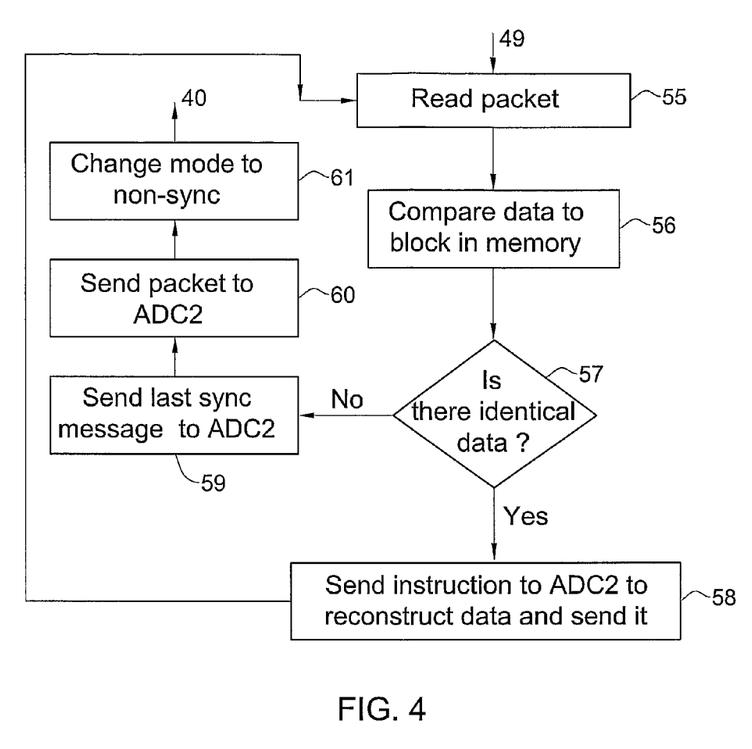
FIG. 4 illustrates a second part of the flow chart of FIG. 3.

FIG. 4 illustrates a second part of the flow chart of FIG. 3 which is the sync mode wherein the two servers operate on a familiar data (i.e. which is already stored locally on the caches of them both). In the sync mode the first server reads a currently received packet as represented by step 55, compares it to the data of corresponding packet in the block that was loaded in step 44 (of FIG. 3), and in case the data in the two blocks is identical the server then send instructions to the second server to reconstruct the data from the block that was fetched by the second server as response to the message that was sent to it in step 46 (of FIG. 3), and to send the reconstructed packet to its destination. In case the comparison taken in step 56 is negative, the first server send a message to the second server that the Sync mode is to be ceased as represented by step 59, and further sends the currently received packet to the second server in its original form. The server then change its mode of operation to non-sync as represented by step 61, and the process starts again, as represented by step 40 of FIG. 3.

Figure 5:
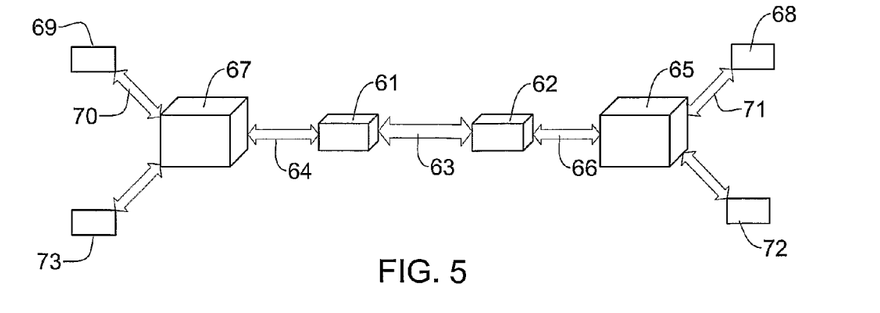
FIG. 5 illustrates an example of system configuration according to the present invention.

FIG. 5 illustrates an example of system configuration according to the present invention, comprising two ADC servers 61 and 62 connected on two ends of a virtual communication line 63 and further communicating through network lines 64 and 66, respectively, with conventional communication networks represented by routers 67 and 65 and by data providers 69 and 68 and data receivers 73 and 72.

By such network configuration and by establishing the communication between the two ADC servers over the virtual line, streams of data may be redirected such that it is assured that the concerned data streams will surely pass through both servers.

The invention claimed is:

1. A communication server configured to deliver a data stream from a remote sender to a remote destination over a communication network, the communication server comprising:
   a data storage unit comprising a non-transitory computer readable medium accessible thereto:
   an anchor-determination unit configured to determine at least one anchor in an incoming data stream, the anchor being indicative of a location in the stream of data where a group of characters in the data stream fulfill a predetermined criterion; the anchor being a reference point indicative of a respective predetermined data range in said data stream for calculating a digital signature identifying a respective data block in said data stream; said data range consisting of a number of bytes which is independent of block size;
   an identification unit configured to:
   calculate said digital signature over said predetermined data range in the data stream; and identify using the digital signature a previously stored data block comprising pieces of data that are substantially identical to pieces of data in said incoming data stream;
   a replacement unit configured, to:
   replace references to the location of pieces of data in the incoming data stream with respective pieces of data in said previously stored data block.

2. The communication server of claim 1 wherein said data block comprises a plurality of packets; said anchor-determination unit is configured to receive a first packet of said plurality of packets, said first packet comprising said data range for calculating said digital signature identifying said data block;
   said replacement unit is configured to replace pieces of data in at least one other packet of said plurality of packets in said data block, said at least one other packet are received later than said first packet.

3. The communication server according to claim 1, wherein the remote sender is a PC delivering data.

4. The communication server according to claim 1, wherein the pieces of data are packets of TCP/IP transmission protocol.

5. The communication server according to claim 1, wherein packets are stored in the data storage unit in blocks of variable size which is determined according to anchor location on the original data stream.

6. The communication server according to claim 1, wherein the digital signature is based on any of CRC, SHA1 or DES computed value of a predetermined number of bytes from a selected piece of data.

7. The communication server according to claim 1, wherein the digital signature is calculated from a predetermined number of bytes of data, the location of said bytes in the data stream is in correlation with at least one anchor, and the at least one anchor is a pointer to a location in the data stream having a compatibility with the predetermined criterion.

8. The communication server according to claim 7, wherein the predetermined criterion is a function of data contained in said pieces of data and is independent of a title, address or routing information of said data.

9. The communication server according to claim 8, wherein the function is responsive to a predetermined character combination such that an anchor is assigned upon recognition of said predetermined character combination.

10. The communication server according to claim 9, wherein the predetermined character combination is a string of predefined characters.

11. The communication server according to claim 9, wherein a set of anchors is assigned to a respective piece of data, each anchor from the set is in correlation to an n-tuple location in said respective piece of data, and wherein the function is a hash function yielding a predefined value over the n-tuple.

12. The communication server according to claim 11, wherein the hash function is selected from the group containing LFSR, CRC, SHA1, DES, and MD5.

13. The communication server according to claim 1, wherein files are delivered through P2P communication.

14. A method of delivering a data stream from a remote sender to a remote destination over a communication network, the method comprising:
   accessing a non-transitory computer readable media containing instructions for controlling a computer system, the instructions comprising computer readable code for:
   determining at least one anchor in an incoming data stream, the anchor being indicative of a location in the stream of data where a group of characters in the data stream fulfill a predetermined criterion; the anchor being a reference point indicative of a respective predetermined data range in said data stream for calculating a digital signature identifying a respective data block in said data stream; said data range consisting of a number of bytes which is independent of block size;
   calculating said digital signature over said predetermined data range in the data stream; and identify using the digital signature a previously stored data block comprising pieces of data that are substantially identical to pieces of data in said incoming data stream; and
   replacing references to the location of pieces of data in the incoming data stream with respective pieces of data in said previously stored data block.

15. A system configured to reduce data transportation volumes over a communication network, comprising at least a first communication server configured to deliver a data stream to a second server over a communication network, the first communication server comprising:
   a data storage unit comprising a non-transitory computer readable medium accessible thereto;
   an anchor-determination unit configured to determine at least one anchor in an incoming data stream, the anchor being indicative of a location in the stream of data where a group of characters in the data stream fulfill a predetermined criterion; the anchor being a reference point indicative of a respective predetermined data range in said packet for calculating a digital signature identifying a respective data block in said data stream; said data range consisting of a number of bytes which is independent of block size;

an identification unit configured to:
calculate said digital signature over said predetermined data range in the data stream; and identify using the digital signature a previously stored data block that is substantially identical to the data block in the data stream;
a replacement unit configured to:
replace pieces of data in at least one packet in the data block in the data stream with references to the location of respective pieces of data in the previously stored data block, thereby generating a reconstructed packet in the data stream; and forward the reconstructed packet to be transmitted to the second communication server.

16. The system of claim 15 further comprising said second communication server the second server being operable to replace said references to the location of respective pieces of data in the reconstructed data stream with respective pieces of data from a previously stored data block.

* * * * *